United States Patent [19]
Friedman et al.

[11] Patent Number: 5,897,904
[45] Date of Patent: Apr. 27, 1999

[54] METHOD FOR THE PRODUCTION OF HIGH PROOF LIQUOR

[75] Inventors: Andrew J. Friedman; Brian L. Nordwall, both of Seattle, Wash.

[73] Assignee: TFE Partnership, Seattle, Wash.

[21] Appl. No.: 08/937,268

[22] Filed: Sep. 15, 1997

Related U.S. Application Data

[63] Continuation of application No. 08/491,541, Jun. 16, 1995, abandoned.

[51] Int. Cl.$^6$ ..................................................... C12G 3/12
[52] U.S. Cl. ............................................ 426/494; 426/592
[58] Field of Search ................................ 426/330.4, 490, 426/494, 520, 592, 493, 492

[56] References Cited

U.S. PATENT DOCUMENTS

| | | | |
|---|---|---|---|
| 3,764,483 | 10/1973 | Tleimat .................................... | 202/236 |
| 3,960,672 | 6/1976 | Ester, deceased et al. ................ | 203/37 |
| 4,328,074 | 5/1982 | Standiford ................................. | 203/19 |
| 4,405,652 | 9/1983 | Boucher .................................... | 426/494 |
| 4,497,842 | 2/1985 | Ehrlich et al. ............................ | 426/592 |
| 4,570,534 | 2/1986 | Boucher .................................... | 99/277 |
| 4,576,824 | 3/1986 | Gubiev et al. ............................ | 426/241 |
| 4,643,083 | 2/1987 | Boucher .................................... | 99/275 |
| 4,775,538 | 10/1988 | Boucher .................................... | 426/14 |
| 4,902,518 | 2/1990 | Lang et al. ................................ | 426/14 |
| 4,933,198 | 6/1990 | Lee et al. .................................. | 426/319 |
| 4,942,045 | 7/1990 | Thumm ..................................... | 426/11 |
| 4,956,194 | 9/1990 | Gos ........................................... | 426/592 |
| 4,971,813 | 11/1990 | Strobel et al. ............................ | 426/51 |
| 4,978,547 | 12/1990 | Petershans ............................... | 426/387 |
| 4,995,945 | 2/1991 | Craig ......................................... | 202/177 |
| 4,999,209 | 3/1991 | Gnekow .................................... | 426/592 |
| 5,013,436 | 5/1991 | Lee et al. .................................. | 210/321.8 |
| 5,013,447 | 5/1991 | Lee et al. .................................. | 210/640 |
| 5,093,141 | 3/1992 | Németh et al. ........................... | 426/493 |
| 5,143,526 | 9/1992 | Lee et al. .................................. | 55/158 |
| 5,356,641 | 10/1994 | Bowen et al. ............................ | 426/52 |

FOREIGN PATENT DOCUMENTS

WO 89/01298   2/1989   WIPO .

OTHER PUBLICATIONS

J. Tyzack, Applications for ATFE's —drying and concentration, The Chemical Engineer, Nov. 15 1990.
J. Tyzack, Applications for ATFE's —distillation. The Chemical Engineer, Feb. 14 1991.
R. Schurter, Evaporation, Think Thin Film, Chemical Engineering, Apr. 1994.
Mutzenberg et al, Agitated Thin Film Evaporators, Chemical Engineering Sep. 13, 1965.
Amerine et al., "The Technology of Winemaking," 3d Ed., AVI Publishing Co., Conn., 1972, pp. 610–629.
Grossman, H.J., "Grossman's Guide to Wine, Beers and Spirits," $6^{th}$ Ed., Scribner's Sons, New York, 1977, pp. 314–315.
Rose, A.H., Economic Microbiology, vol. 1, Alcoholic Beverages, Academic Press, New York, 1977, pp. 580–581.
Varnam et al., Beverages, vol. 2, Chapman & Hall, New York, 1994, pp. 41 and 442.

*Primary Examiner*—Curtis E. Sherrer
*Attorney, Agent, or Firm*—Seed and Berry LLP

[57] ABSTRACT

Methods for producing a liquor having a high alcohol content are disclosed. Such methods employ mild conditions for increasing the alcohol content of the liquor, resulting in decreased levels of by-products that may adversely affect the taste. The high proof liquor generated by the methods disclosed herein is suitable for the preparation of alcoholic beverages such as brandy.

12 Claims, 2 Drawing Sheets

METHOD FOR THE PRODUCTION OF HIGH PROOF LIQUOR

CROSS-REFERENCE TO RELATED APPLICATION

This application is a continuation of U.S. patent application Ser. No. 08/491,541, filed Jun. 16, 1995, now abandoned.

TECHNICAL FIELD

The present invention is generally directed to the preparation of high alcohol content liquors. In particular, this invention is directed to methods for producing high proof liquor under mild conditions, and without introducing gases or maintaining a vacuum. The liquor produced by the methods of this invention may be used, for example, in the preparation of brandy.

BACKGROUND OF THE INVENTION

Brandy and other liquors are commonly produced from fruit by fermentation, followed by distillation and a reflux step to increase the alcohol concentration. In most conventional techniques, distillation takes place under relatively harsh conditions, which form by-products that adversely affect the taste. In an effort to alleviate this problem, a few methods have been developed for distillation under milder conditions. However, such methods typically involve additional steps, such as the introduction of an inert gas or maintaining vacuum conditions during distillation, which render the process more complicated and more costly.

Accordingly, there is a need in the art for more efficient methods of producing a quality high proof liquor suitable for the preparation of brandy and other alcoholic beverages. The present invention fulfills these needs and provides further related advantages.

SUMMARY OF THE INVENTION

Briefly stated, this invention provides methods for preparing a high proof liquor. In one embodiment, the method consists essentially of: (a) contacting a fermented fruit base with a thin film evaporator maintained without the introduction of an inert gas at a pressure of at least atmospheric pressure and a temperature sufficient to yield a liquid phase and a vapor phase, wherein the vapor phase contains ethanol, water, flavors and odors; and (b) condensing the vapor phase to produce a high proof liquor.

In another embodiment, the method consists essentially of: (a) contacting a fermented fruit base with a thin film evaporator maintained without the introduction of an inert gas at a pressure of at least atmospheric pressure and a temperature sufficient to yield a liquid phase and a vapor phase, wherein the vapor phase contains ethanol, water, flavors and odors; (b) condensing the vapor phase to produce a high proof liquor; and (c) passing the condensed vapor phase through a packed stripping column maintained at a temperature sufficient to evaporate methanol and acetaldehyde from the condensed vapor phase.

These and other aspects of the present invention will become evident upon reference to the following detailed description and attached drawings.

DETAILED DESCRIPTION OF THE INVENTION

Figure 1:
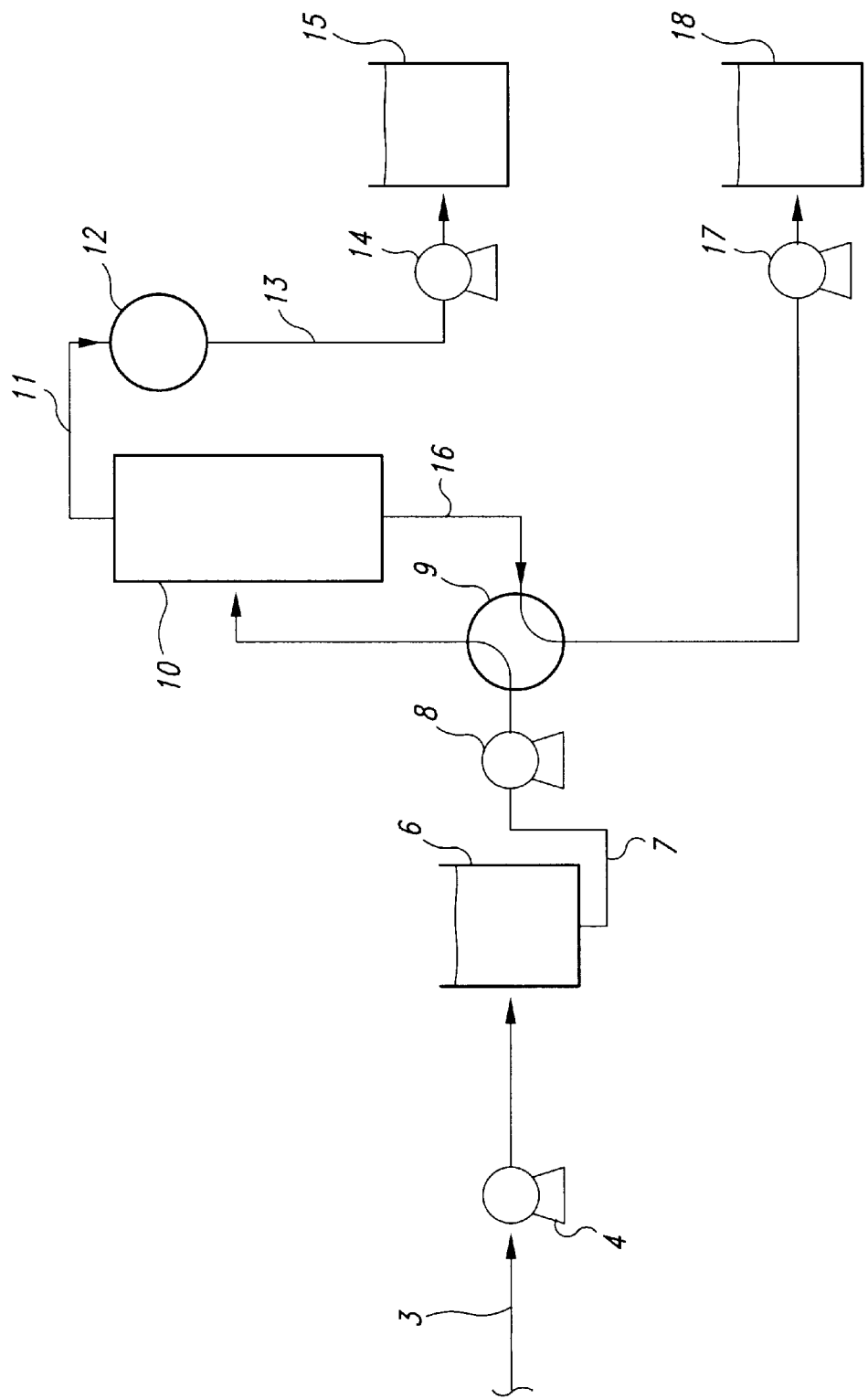
FIG. 1 is a flow chart which depicts a representative process for preparing a high proof liquor.

As noted above, the present invention provides methods for preparing high proof liquor. In general, the methods of this invention employ a thin film evaporator to generate a high proof product from a fermented fruit base. No vacuum is employed during the process, and no water, inert gas or other material is introduced. The resulting liquor has unusually low levels of by-products and an improved taste.

The fermented fruit base may generally be prepared from any appropriate fruit known to those of ordinary skill in the art. Suitable fruits include (but are not limited to) apples, pears, grapes, cherries, apricots, prunes, plums and combinations thereof. Prior to fermentation, the fruit is subjected to a light crushing. The crushing may be performed by any conventional means, including conventional stemmer-crushers employed in the manufacture of wine from grapes. In the case of fruits such as apples and pears, the level of crushing should be sufficient to generate a pulp from such fruits.

Following the light crushing, the fruit is fermented with yeast. Any yeast strain suitable for the preparation of alcoholic beverages may be employed. In general, yeast is added to the crushed fruit, and allowed to ferment for a period of time sufficient to generated a fermented fruit base containing about 7–13% ethanol.

Optionally, the fermented fruit base may be filtered to remove solid materials. If filtering is desired, any suitable conventional filtering device known to those of ordinary skill in the art may be employed. For example, filtering may be achieved using a plate and frame filter. It should be understood, however, that filtering of the fermented fruit base is not essential. The methods disclosed herein may be employed using either filtered or unfiltered fermented fruit base.

Prior to generation of the high proof liquor of this invention, the fermented fruit base may be stored in one or more holding tanks, either at ambient temperature or (for long term storage) cooled to about 4–6° C. Typically, the holding tanks are equipped with an agitator to prevent the deposit of solid materials on the interior walls of the tank.

In the practice of this invention, the fermented fruit base is generally transferred from a holding or fermentation tank, with or without filtration, to a heat exchanger. Such transfer may be achieved using a suitable pump and tubing. As discussed in more detail below, the heat exchanger is operated to facilitate the transfer of heat from the low ethanol by-product to the fermented fruit base. The resulting temperature of the fruit base should be about 60–65° C.

The heated fruit base is then pumped to a thin film evaporator for the removal of a concentrated ethanol phase. Such thin film evaporators are commercially available from, for example, LCI Corporation (Charlotte, N.C.) and Artisan Industries (Waltham, Mass.), and may generally be operated according to the manufacturer's instructions. Briefly, the fermented fruit base is poured along the internal walls of a cylinder and is maintained in contact with the walls by the rotation of a stainless steel blade. The cylinder is generally maintained at an evaporation temperature of between about 65° C. and 100° C., preferably between about 70° C. and about 90° C., in order to evaporate ethanol, water, and odor and flavor molecules. The material that does not evaporate is removed from the system and is transferred to a waste tank for disposal. It should be noted that centrifugal thin film evaporators (i.e., evaporators that use centrifugal force to maintain the fruit base in contact with the heated surface) cannot be used to heat an unfiltered, pulpy fruit base and, accordingly, may not be employed in the present invention.

The vapor phase then passes to a condenser, which is maintained at a temperature sufficient to condense substantially all of the vapor phase into a high proof liquid. In general, a temperature of about 65° C.–70° C. is appropriate for condensation. Any condenser of sufficient capacity may be employed for condensation of the vapor phase. The concentration of alcohol in the condensed vapor phase is generally between about 35% and about 80%, and typically between about 45% and about 75%.

Optionally, the condensate may then proceed to a second evaporator, preferably a packed stripping column, for the removal of highly volatile impurities, such as acetaldehyde and methanol. Suitable packed stripping columns are available from commercial sources such as APV Crepaco (Tonawanda, N.Y.), Glitsch (Dallas, Tex.), and Rashig (Richmond, Va.), and may generally be operated according to the manufacturer's instructions. Briefly, the condensate is poured onto the top of a heated column containing ceramic or glass saddles (or beads) that interrupt the flow of condensate through the column. The column is heated to a temperature sufficient to evaporate the more volatile impurities, typically to between about 55° C. and 70° C. As the liquid condensate travels downward through the column, the volatile impurities travel upward and are removed from the top of the column and condensed prior to disposal. The concentration of ethanol remaining in the liquid phase is generally between about 40% and about 85%, typically between about 40% and 65%. It should be noted that the optional second evaporation process is distinct from refixing in that the desired ethanol-containing portion is not re-evaporated. If removal of highly volatile impurities is desired, the use of a counter-current evaporator in accordance with the present invention minimizes the heating of the high alcohol content product.

It has been found, in the context of this invention, that the condensation of the vapor phase prior to introduction into the optional second evaporator (as described above) is necessary for maximum efficiency. Accordingly, in the practice of this invention, condensation of the vapor phase takes place immediately following emission from the thin film evaporator.

Following condensation (and evaporation of impurities, if desired), the high proof liquor may be transferred to a suitable storage tank. The resulting high proof liquor generally contains about 40–70% ethanol, and is suitable for the production of alcoholic beverages, such as brandy, using techniques well known to those of ordinary skill in the art.

It should be noted that the methods described above have several distinct advantages over existing technologies. For example, no vacuum is required, and the pressure within the system is generally maintained at or above atmospheric pressure. In addition, the fermented fruit base employed in the methods of this invention need not be filtered and no water, inert gas or other material is added to the fruit base. Furthermore, no recirculation of material is necessary. These features result in a simplified, more efficient process. In addition, by minimizing the heating of the fermented fruit base, a product with improved taste is generated. These represent significant improvements in the preparation of high proof liquors.

A preferred process for producing a high proof liquor by the methods of this invention is illustrated in FIG. 1. In this embodiment, the fermented fruit base passes through feed pipe 3 via feed pump 4 to holding tank 6. In an optional embodiment (not shown), solid material is removed from the fermented fruit base by passing the same through a suitable filter. The fruit base then passes through pipe 7 via feed pump 8 and into heat exchanger 9 prior to entry into thin film evaporator 10. The vapor phase exits thin film evaporator 10 via vapor pipe 11 and passes to condenser 12, condensate pipe 13, pump 14 and receiving tank 15. Receiver tank 15 collects the high alcohol content product.

The liquid phase generated in thin film evaporator 10 passes through bottoms pipe 16 to heat exchanger 9 and is pumped by bottoms pump 17 to bottoms receiving tank 18. Bottoms receiving tank 18 collects the low alcohol content material.

Figure 2A:
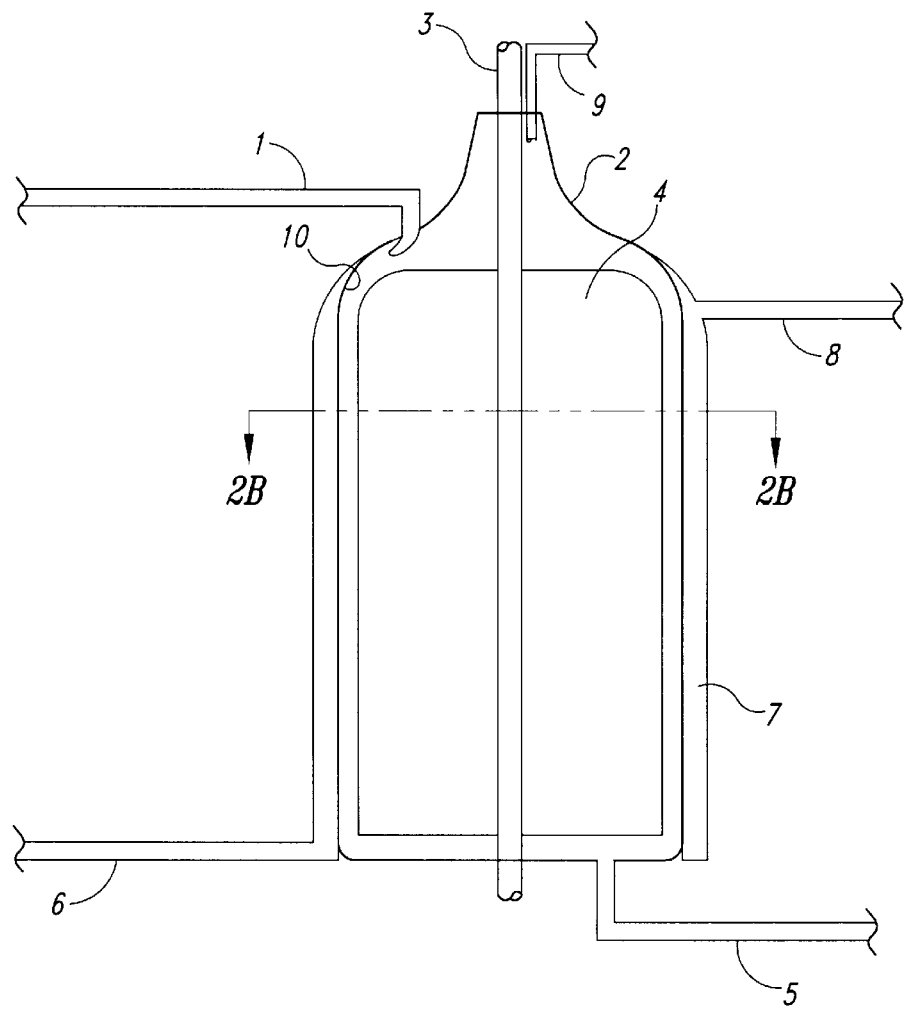
FIGS. 2A and 2B illustrate a representative thin film evaporator for use in the methods described herein.

A representative thin film evaporator for use in the context of this invention is shown in FIG. 2A. Fermented fruit base enters via input line 1 and passes along the interior wall 10 of thin film evaporator 2. Rotor 3 turns blade 4, which maintains the fermented fruit base in contact with the interior wall of thin film evaporator 2. Unevaporated material exits thin film evaporator 2 by way of bottoms outflow 5. The thin film evaporator is heated with steam, which enters steam jacket 7 by way of steam input 6, and exits by way of steam outflow 8. Evaporated material (i.e., vapor phase) exits thin film evaporator 2 via vapor outflow 9.

Figure 2B:
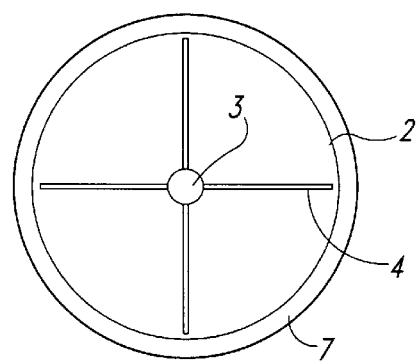

FIG. 2B is a top elevational view of the thin film evaporator of FIG. 2A, taken along line 2B—2B. FIG. 2B shows rotor 3, blade 4 and steam jacket 7 of thin film evaporator 2.

The following examples are provided by way of illustration, and not by way of limitation. All percentages in the examples, as well as the specification and claims, are by volume unless otherwise specified.

EXAMPLES

EXAMPLE 1

Preparation of Brandy

This example illustrates the production of brandy from a clarified wine using the representative method shown in FIG. 1.

The clarified wine is heated to 70° C. in the heat exchanger prior to passage into the thin film evaporator maintained at 85° C. The vapor phase is then condensed in a 65° C. condenser and passes through a packed stripping column maintained at 71° C. The material that evaporates in the packed stripping column is removed, and the liquid portion is pumped into the receiving tank. The resulting high proof liquor contains approximately 60% ethanol.

The high proof liquor is placed in used limousin oak barrels and is stored for 3–7 years at room temperature. The resulting brandy contains approximately 40–45% ethanol and has a pleasing taste. The brandy may, but need not, be blended prior to consumption.

EXAMPLE 2

Preparation of Grappa

This example illustrate the production of Grappa using the representative method of FIG. 1.

A pomace of muscat grape is refermented to yield a fermented fruit base having about 7% ethanol. The fermented fruit base is pumped directly into the heat exchanger (i.e., without filtration), where it is heated to 65° C. The heated fruit base then passes to the thin film evaporator, which is maintained at 90° C., and the vapor phase is condensed at 65° C. The condensed vapor phase then passes to a packed stripping column maintained at 68° C. The material that evaporates in the packed stripping column is removed, and the liquid portion is pumped to the receiving tank. The high proof liquor contains 40–50% ethanol. This liquor may be stored in glass bottles and sold as Grappa without further aging.

From the foregoing, it will be evident that although specific embodiments of the invention have been described herein for the purposes of illustration, various modifications may be made without deviating from the spirit and scope of the invention.

We claim:

1. A method for preparing a high proof liquor, consisting essentially of:
   (a) contacting a fermented fruit base having undissolved solids with an agitated thin film evaporator maintained without the introduction of an inert gas at a pressure of at least atmospheric pressure and a temperature sufficient to yield a liquid phase and a vapor phase, wherein the vapor phase contains ethanol, water, flavors and odors; and
   (b) condensing the vapor phase to produce a high proof liquor.

2. The method of claim 1 wherein the fermented fruit base is prepared from fruit selected from the group consisting of apples, pears, grapes, cherries, apricots, prunes, plums and combinations thereof.

3. The method of claim 1 wherein the temperature of the thin film a evaporator ranges from about 65° C. to about 100° C.

4. The method of claim 1 wherein the temperature of the thin film evaporator ranges from about 70° C. to about 90° C.

5. The method of claim 1 wherein the amount of ethanol present in the high proof liquor ranges from about 40% to about 85% by weight of the high alcohol content product.

6. A method for preparing a high proof liquor, consisting essentially of:
   (a) contacting a fermented fruit base having undissolved solids with an agitated thin film evaporator maintained without the introduction of an inert gas at a pressure of at least atmospheric pressure and a temperature sufficient to yield a liquid phase and a vapor phase, wherein the vapor phase contains ethanol, water, flavors and odors; and
   (b) condensing the vapor phase to produce a high proof liquor; and
   (c) passing the condensed vapor phase through a packed stripping column maintained at a temperature sufficient to evaporate methanol and acetaldehyde from the condensed vapor phase.

7. The method of claim 6 wherein the fermented fruit base is prepared from fruit selected from the group consisting of apples, pears, grapes, cherries, apricots, prunes, plums and combinations thereof.

8. The method of claim 6 wherein the temperature of the thin film evaporator ranges from about 65° C. to about 100° C.

9. The method of claim 6 wherein the temperature of the thin film evaporator ranges from about 70° C. to about 90° C.

10. The method of claim 6 wherein the amount of ethanol present in the high proof liquor ranges from about 40% to about 85% by weight of the high alcohol content product.

11. The method of claim 6 wherein the temperature of the packed stripping column ranges from about 55° C. to about 70° C.

12. The method of either of claims 1 or 6 wherein the high proof liquor is subsequently used in the preparation of brandy.

* * * * *